United States Patent [19]

Juravic

[11] Patent Number: 4,645,404

[45] Date of Patent: Feb. 24, 1987

[54] APPARATUS FOR REMOVING AN ADHERED FRAGILE FOOD PRODUCT FROM A SUPPORT SURFACE

[75] Inventor: Davor Juravic, San Pedro, Calif.

[73] Assignee: Star-Kist Foods, Inc., Terminal Island, Calif.

[21] Appl. No.: 651,488

[22] Filed: Sep. 17, 1984

[51] Int. Cl.$^4$ ............................................. A47J 27/62
[52] U.S. Cl. .................................... 414/417; 414/418;
414/403; 83/155.1; 198/598; 198/599; 198/635;
99/644; 99/355
[58] Field of Search ............... 414/418, 415, 416, 417,
414/403; 83/89, 155.1; 193/2 B; 198/598, 599,
635; 99/644, 355

[56] References Cited

U.S. PATENT DOCUMENTS

| | | | |
|---|---|---|---|
| 1,351,018 | 8/1920 | Blando | 414/417 X |
| 2,567,542 | 9/1951 | Blake | 414/415 X |
| 2,609,944 | 9/1952 | Nicoletti | 414/415 |
| 2,640,445 | 6/1953 | Reget | 414/418 X |
| 2,821,314 | 1/1958 | Gibbons et al. | 414/418 |
| 2,875,683 | 3/1959 | Burns | 99/425 |
| 2,935,215 | 5/1960 | Rose | 414/415 X |
| 3,057,497 | 10/1962 | Stadelman | 414/416 |
| 3,338,486 | 8/1967 | Gaylor | 224/49 |
| 3,410,429 | 11/1968 | Eschenroeder et al. | 414/417 |
| 3,456,578 | 7/1969 | Pinsly | 99/386 X |
| 3,749,000 | 7/1973 | Vidjak | 99/425 |
| 3,893,384 | 7/1975 | Lo Biondo et al. | 99/485 |
| 4,026,421 | 5/1977 | Lotz. | |
| 4,034,119 | 7/1977 | Kanbe et al. | 99/355 X |
| 4,085,482 | 4/1978 | Charron | 17/26 |
| 4,133,075 | 1/1979 | Collins | 17/26 |
| 4,239,785 | 12/1980 | Roth | 426/266 |
| 4,273,496 | 6/1981 | Papalexis | 414/417 |
| 4,348,787 | 9/1982 | Wolff | 17/27 |
| 4,429,625 | 2/1984 | Nelson | 99/425 |

FOREIGN PATENT DOCUMENTS 2443651 4/1976 Fed. Rep. of Germany ...... 414/416
6406307 12/1964 Netherlands ...................... 414/416

Primary Examiner—Frank E. Werner
Attorney, Agent, or Firm—Fulwider, Patton, Rieber, Lee & Utecht

[57] ABSTRACT

An apparatus for use in releasing a fragile food product which has become stuck to a support surface as a result of a prior processing operation, and for transferring the released food product from the support surface in an orderly fashion so that the food product can be further processed and the support surface returned for reuse. In a preferred embodiment, a releasing roller having flexible rubber projections thereon rotates below a tray which supports strips of an extruded meat product stuck to the tray, with the projections extending upwardly through apertures in the tray to gently contact the underside of the meat strip. A back-up roller above the tray and offset horizontally from the releasing roller restrains the trays and strips from moving upwardly, thereby cooperating with the releasing roller to free the adhered food product. The tray is then inverted onto a strip conveyor belt, the strip conveyor belt having a depressed central portion and raised side portions so that the ends of the tray are supported on the raised side portions with the released food product either falling onto the strip conveyor belt or being suspended just above the strip conveyor belt. A peeling plate is positioned at a height intermediate between the depressed and raised portions of the strip conveyor belt, and with a tapered leading edge pointing against the motion of the strip conveyor belt, to separate the trays, which are lifted upwardly over the peeling plate, from the strips of food product, which remain on the strip conveyor belt.

6 Claims, 12 Drawing Figures

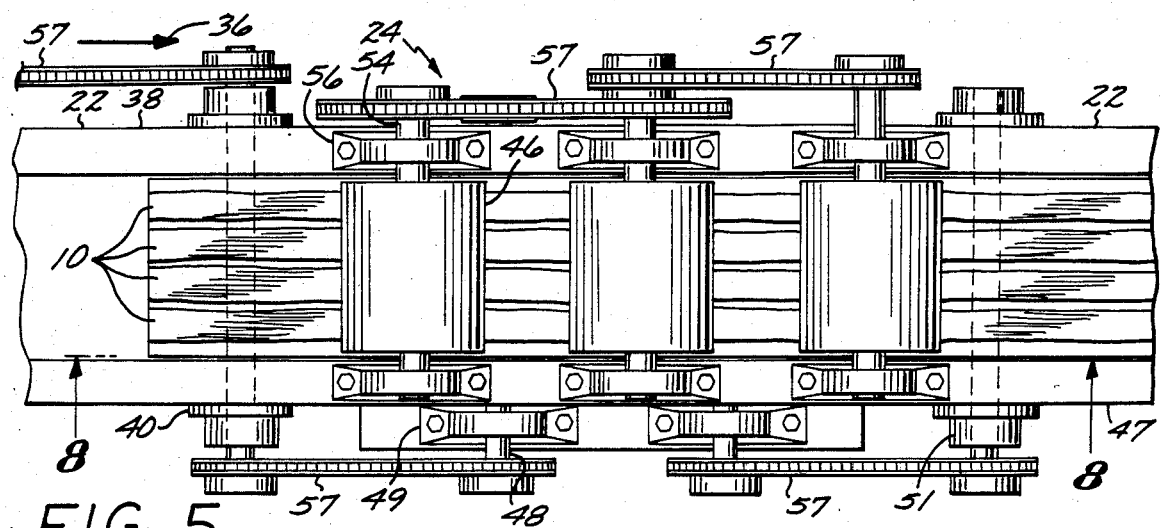
FIG.5
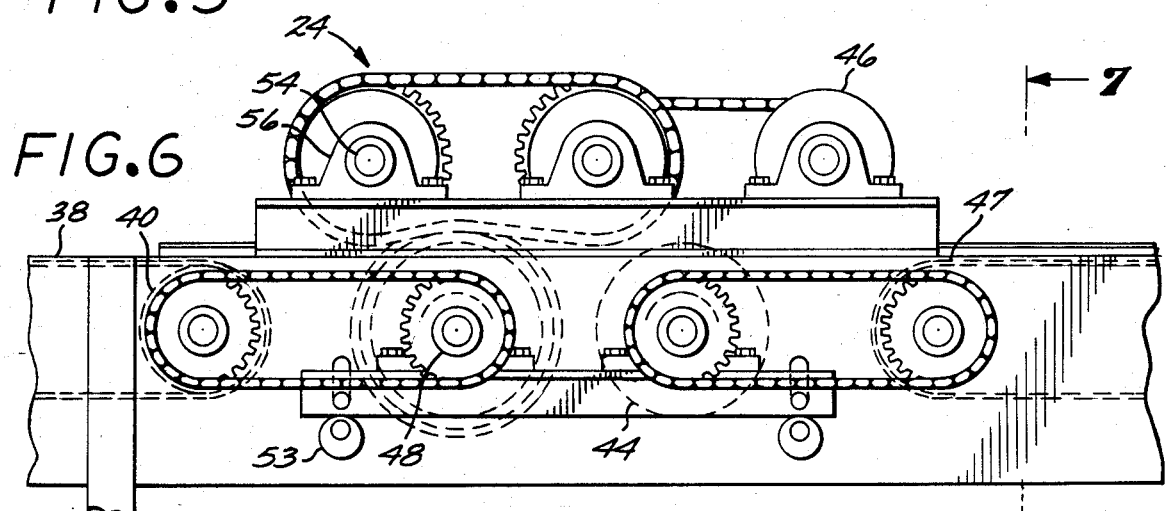
FIG.6
FIG.7
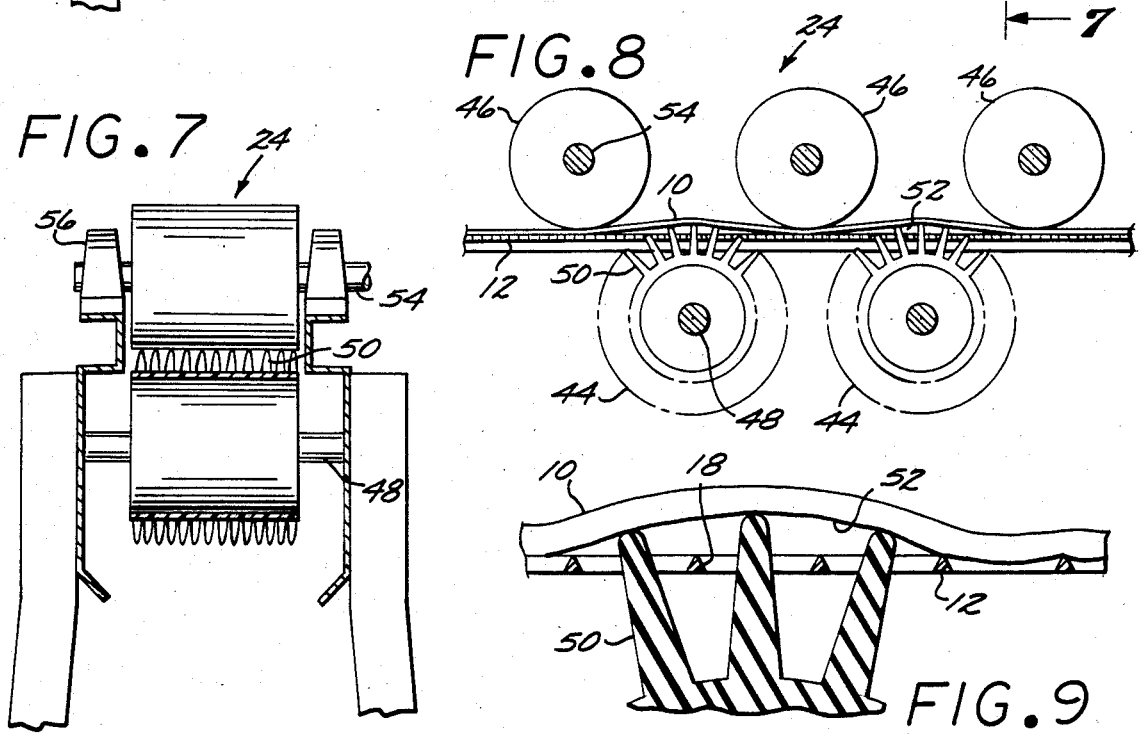
FIG.8
FIG.9

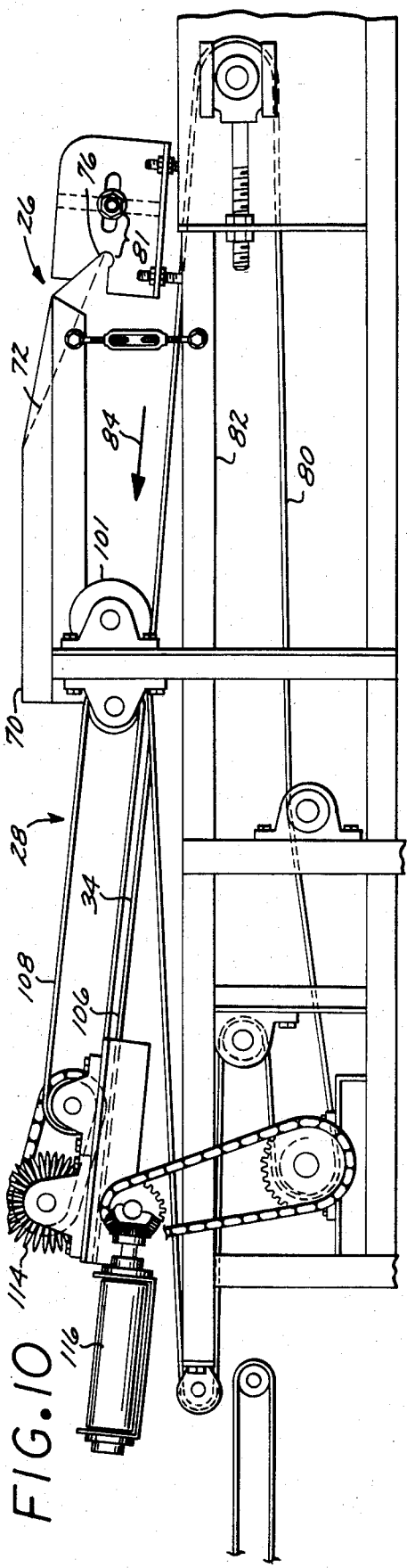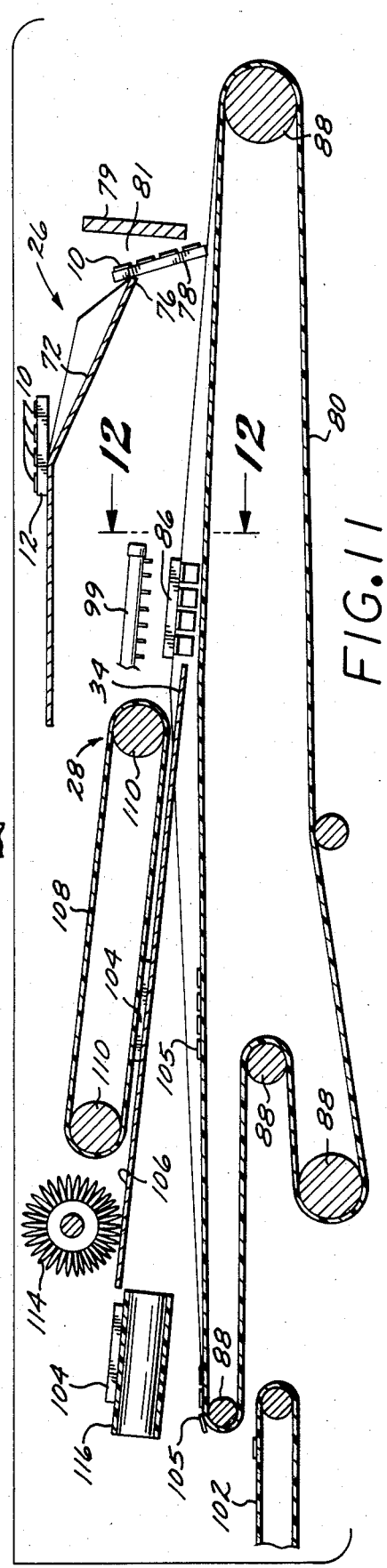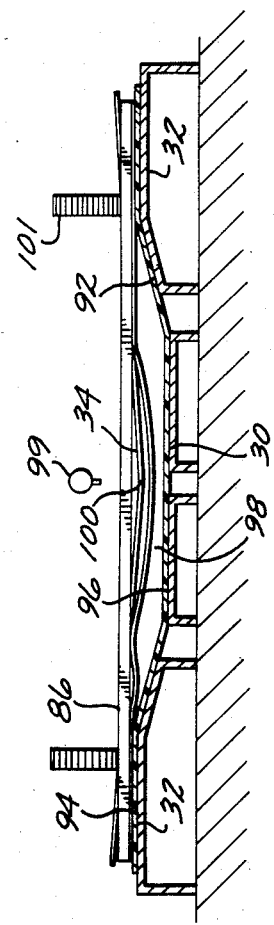

APPARATUS FOR REMOVING AN ADHERED FRAGILE FOOD PRODUCT FROM A SUPPORT SURFACE

BACKGROUND OF THE INVENTION

This invention relates generally to food processing machinery, and, more particularly, to machinery for releasing and removing food products adhered to support surfaces.

As will be known to persons familiar with home-scale and industrial-scale food processing, food products often adhere to supporting surfaces upon which they are prepared. For example, the underside of a piece of meat may adhere to the surface of a cooking pan when the meat rests in the pan during cooking. When the cook attempts to free the stuck meat or other food product, the integrity of the piece may be lost, with the result that the food is ruined or at least made less attractive in appearance.

The usual solution to the problem of food products that stick to surfaces is to attempt to avoid the sticking problem in the first place. Surfaces may be coated to inhibit sticking, as with the use of a tefloncoated pan or the placing of grease into a fry pan to prevent sticking. The use of cooking racks or special procedures for suspending food products during processing can also be used in some situations.

The problem of sticking can be particularly troublesome where the food product is in the form of a thin strip or sheet. If a thin strip or sheet sticks to an underlying support surface, freeing of the thin piece is made even more difficult, and a major portion of the thin piece may be lost during the process of releasing it from the support surface. The freeing of a thin piece of food product is complicated even further when the piece is stuck over a large portion of its surface area, and when the food product is relatively fragile. While the releasing of such food products from supporting surfaces can be a problem in a home environment, the problem is magnified in the food processing industry and can often pose a major obstacle to the automation of food preparation processes.

In some commercial-scale food preparation operations, it is not possible to coat the supporting surfaces or otherwise suspend the food product so that sticking is completely avoided. As an example, meat jerky may be prepared on a commercial scale for human or animal consumption by preparing a meat-containing mixture and extruding the mixture through a die to form a strip. The strip is extruded onto a tray having apertures through the bottom thereof, to support the strip during further processing. The presence of the apertures is desirable, as in the next step the strips of extruded meat product, supported by the tray, are placed into a drying oven wherein the moisture contained in the extruded strip is removed by heating at a relatively low temperature. The apertures permit greater air circulation to accelerate drying.

During the drying operation, the extruded meat strips usually stick to the traps for two reasons. First, proteinaceous material contained within the meat can bake onto the interface between the support surface and the strip to bind the meat strip to the tray. Second, and more importantly, during the drying operation the strips of meat tend to sag into the apertures, thence becoming physically engaged to the apertures as the meat dries.

In the past, the usual way to free the adhered strips of meat from the tray, after drying is completed, was to invert the tray and impact the tray against a hard surface, to jar the meat strips loose so that they fall from the tray. Another approach is to attempt to force a knife between the strip of dried meat and the surface of the tray bottom to which it has adhered. Both of these approaches suffer from a severe disadvantage, in that the dried meat strip is fragile and tends to break into short lengths when so released. The short broken lengths are not readily packaged for sale to the consumer. In some cases, the short pieces are unacceptable for commercial sales and must be discarded, resulting in substantial waste. Further, these two methods of releasing the meat product from the tray are highly labor intensive and substantially increase the cost of the final product.

Accordingly, there has been an ongoing need for a process and apparatus for releasing and removing fragile food products such as strips of dried, extruded meat from supporting surfaces to which they have adhered. The apparatus must gently release the food product to avoid breakage and waste. The apparatus should be compatible with existing processing machinery to avoid large capital expenditures, and preferably provide the separated food product to further processing machinery in an orderly presentation, to facilitate yet further automation of the processing. The present invention fufills this need, and further provides related advantages.

SUMMARY OF THE INVENTION

The present invention resides in an apparatus for removing a fragile food product from an apertured support surface to which the food product has adhered. The apparatus first gently releases the food product from the support surface, and then transfers the food product from the support surface for further processing. The invention finds particular utility where the food product has been previously processed on the support surface and has adhered to the support surface during an operation such as cooking, freezing or drying. The food product is gently freed from the support surface without imposing large loadings on the food product which might break it, preferably while retaining the food product on the supporting surface. Removal of the food product from the support surface is then completed in an orderly manner so that the food product may be further processed. The apparatus is fully automated, does not require hand labor, and greatly increases the yield of unbroken food product, as compared with manual operations.

In accordance with the invention, an apparatus for use in releasing and removing a fragile food product from a support surface having apertures therethrough comprises a means for gently deflecting the food product upwardly by applying a force to the food product through the apertures, and means for restraining the support surface from moving upwardly under the influence of the means for deflecting, the means for restraining being horizontally offset from the means for deflecting so that the support surface is flexed upwardly by the deflecting force. The food product is at least partially released from the sticking contact with the support surface, while at the same time remaining supported by the support surface over substantially its entire contacted area. The apparatus may further include a separate means for carrying the food product after the food product is released from the support surface, and a means for transferring the food product from the support surface to the carrying means, the means for transferring including a means for mechanically releasing a portion of the food product from the support surface in the event that a portion of the food product remains adhered to the support surface following the prior releasing step.

In a preferred embodiment having particular applicability to the removal of a proteinaceous food product such as extruded meat from a tray upon which the food product is dried, the apparatus includes a tray conveyor for moving the tray with the adhered food product thereon through a releasing station. The releasing station includes at least one, and preferably two, releasing rollers positioned below the tray, the releasing rollers having flexible protrusions thereon. The protrusions extend upwardly through the tray apertures to contact and lift the underside of the food product as the tray passes over the releasing roller. At least one, and preferably three, back-up rollers are positioned above and in contact with the upper side of the meat strips or the tray, the back-up rollers being displaced horizontally from the releasing rollers so that the food product is flexed upwardly to release the food product from the tray.

The preferred apparatus also includes a strip conveyor belt positioned generally below and perpendicularly to the tray conveyor. The strip conveyor belt has a depressed central portion and raised side portions extending parallel to the direction of motion of the strip conveyor belt, with the width of the depressed portion being less than the length of the tray, so that the tray is supported over the depressed portion by contact of the ends of the tray with the raised side portions.

The tray is inverted onto the strip conveyor belt by a tray inverter at the end of the tray conveyor. The tray inverter includes a tray deflector to deflect the tray sideways and a tray drop channel for receiving a leading sideways edge of the tray and conducting the leading edge downwardly, whereupon the leading edge is directed into contact with the strip conveyor belt and inverted by the movement of the strip conveyor belt. The food product, if fully released from the tray in the releasing station, then drops gently onto the strip conveyor belt and is conveyed away for further processing. A peeling plate is positioned adjacent the strip conveyor belt with a forward edge disposed intermediate the depressed and raised portions of the strip conveyor belt and pointed oppositely to the motion of the strip conveyor belt, whereby the peeling plate forces the inverted trays upwardly and the strips of food product downwardly to remain on the strip conveyor belt. If the food product was not fully released from contact with the tray during the prior releasing operation, the peeling plate completes the releasing of the food product.

It will be appreciated from the foregoing that the present invention represents an advance in the processing of food products which tend to adhere or stick to support surfaces during processing such as cooking, freezing or drying. After such processing, the food products are often rather fragile or brittle, and may undesirably be broken into small pieces by conventional processing to release and remove the food product from the sticking contact with the support surface. In the apparatus of the present invention, the food product is gently released and removed from the trays in an orderly fashion well suited for positioning the food product for further processing such as cutting and packaging. The apparatus reduces labor requirements substantially, and in addition reduces the breakage and consequent waste of portions of the food product. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 5 is a top plan view of a releasing station portion of the apparatus of FIG. 1;

FIG. 6 is a side elevational view of the releasing station of FIG. 5, with portions broken away;

FIG. 7 is an end sectional view of the apparatus of FIG. 6, taken generally on line 7—7;

FIG. 8 is a side sectional view of the apparatus of FIG. 5, taken generally on line 8—8;

FIG. 9 is an enlarged detail view of a portion of FIG. 8, illustrating the releasing of a meat strip from the tray;

FIG. 10 is a side elevational view of a strip removing portion of the apparatus of FIG. 1;

FIG. 11 is a side sectional digrammatic view of the apparatus of FIG. 10; and

FIG. 12 is an enlarged end section view of the apparatus of FIG. 11, taken generally on line 12—12.

DETAILED DESCRIPTION OF THE PREFERRED EMBODIMENT

Figure 1:
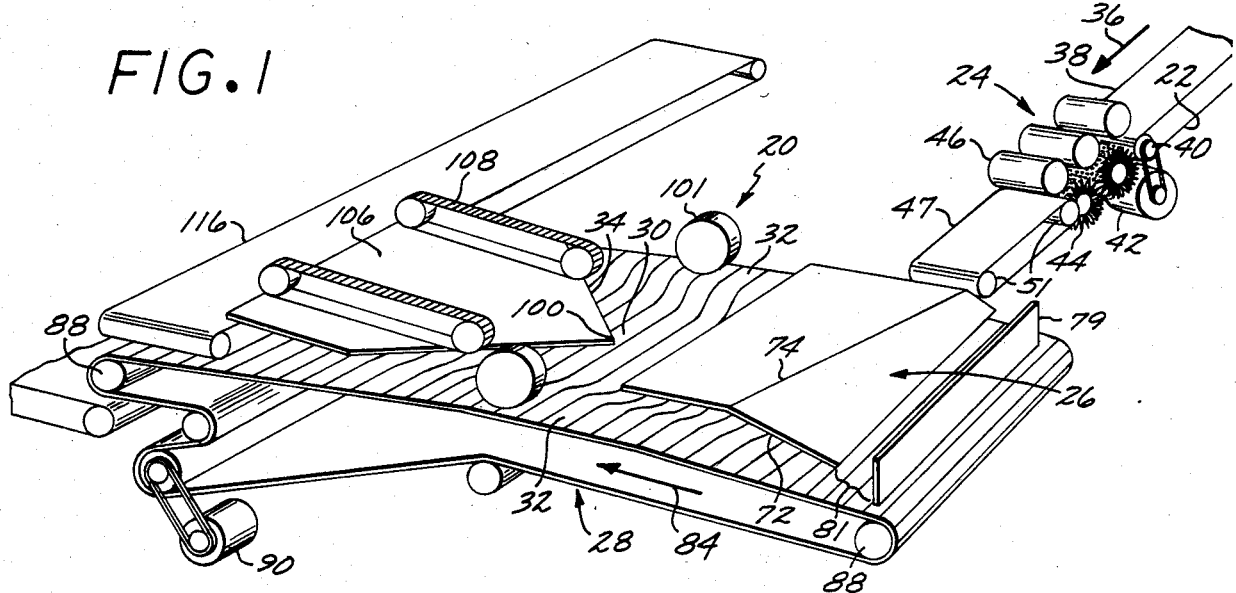
FIG. 1 is a diagrammatic perspective view of an apparatus for releasing and removing extruded meat strips from trays.

As is shown in the drawings, the preferred embodiment of the invention relates to an apparatus for releasing and removing strips of extruded meat products from support surfaces such as trays. One such extruded meat product may be formed by mixing together the following ingredients in the indicated amounts, by weight: 75% meat by-products, 15% beef, 1% wheat flour, 1% cane molasses, 2% dextrose, 2% salt, 2% water, and 2% spices and preservatives. This mixture is then extruded or otherwise formed into meat strips 10 having dimensions of about 1¼ inch wide by 0.165 inch thick by 48 inches long. Because the strips have a relatively high moisture content and include fibers of meat, they cannot be readily and neatly cut in the as-extruded form into the desired length of about 4¼ inches for packaging. It is therefore necessary to dry the meat strips first, before cutting into the shorter pieces.

Figure 2:
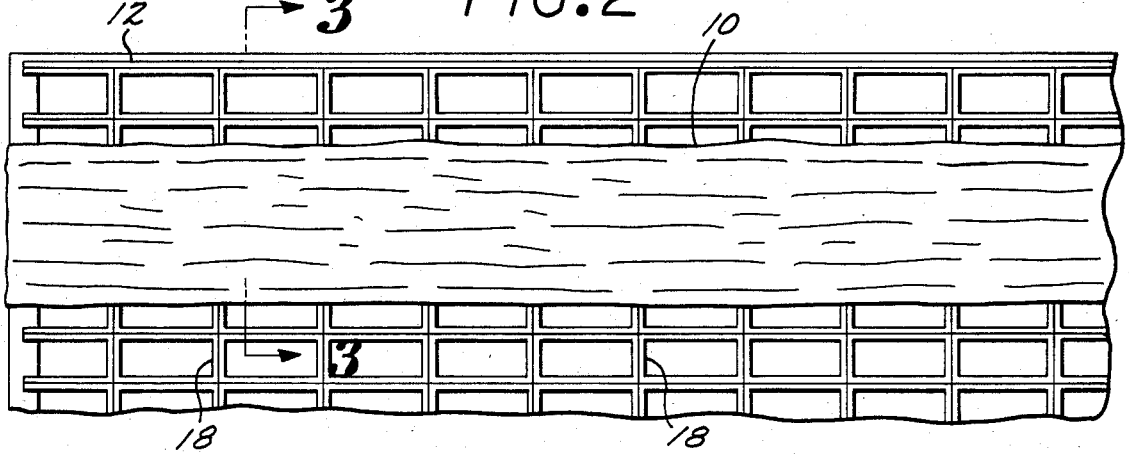
FIG. 2 is a top plan view of a portion of a tray supporting a meat strip thereon.
Figure 3:
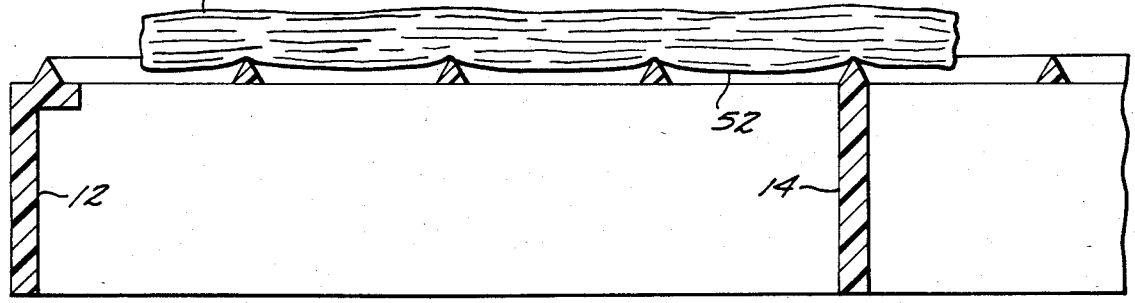
FIG. 3 is a sectional view of the tray of FIG. 2, taken generally on line 3—3.
Figure 4:
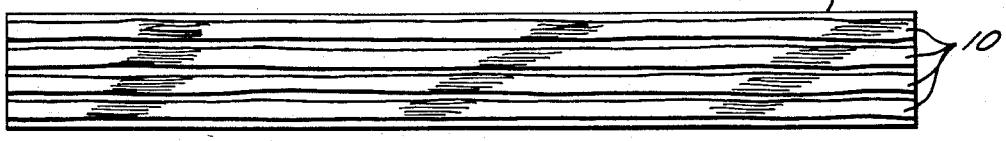
FIG. 4 is a top plan view of the entire tray, having four meats strips supported theron.

FIGS. 2, 3 and 4 illustrate a tray 12 into which the meat strips 10 are extruded. Such a tray 12 is typically made of plastic and is about 6 inches wide and 48 inches long, so that four strips 10 are supported thereon as illustrated in FIG. 4, with the underside of the tray 12 having crosswise and lengthwise ribs 14 for strength. An array of apertures 18 are formed through the surface of each of the trays 12. Each aperture 18 is about ⅜ inches wide and ¾ inches long, and there are typically about 544 apertures per tray. After the strips 10 are extruded onto the surface of the trays, the trays 12 are stacked on racks or carts and placed into a drying oven operating at about 150°-170° F. for a period of 4-5 hours, to dry the moisture from the meat strips 10 to form a dried meat or jerky product. The apertures 18 in the bottom of the trays 12 improve the circulation of dry air to the meat strips 10, thereby increasing the rate of drying of the meat strips 10. However, during the drying the meat strips 10 tend to sag into the apertures 18, thereby causing sticking of the dried meat strips 10 to the walls of the apertures 18, as illustrated in FIG. 3. The proteinaceous matter of the meat also bakes to the surface of the tray, causing sticking. During drying, the meat strips 10 tend to shrink due to the removal of moisture, and typically have a dried cross sectional size of about 1 inch by $\frac{1}{8}$ inch.

To remove the meat strips 10 from the trays 12, it has been the prior practice to invert the tray 12 over a flat surface and then repeatedly pound the tray 12 against the flat surface to loosen the meat strips 10 so that they fall to the flat surface. This approach often caused the 48 inch long meat strip 10 to break into shorter pieces, which typically were not of the proper lengths for cutting and packaging at the desired uniform lengths of about $4\frac{1}{4}$ inches. As a result, some of the dried meat strip was wasted. The meat strips 10 would break into shorter lengths during pounding of the trays because, after drying, the meat strips are relatively fragile and readily torn. In this respect, the dried meat strips are similar to many other cooked or dried food products which stick to trays or other types of preparation surfaces and must be freed to allow subsequent processing. Additionally, the prior practice was essentially a manual operation, and extensive labor was required.

In accordance with the present invention, an apparatus, generally denoted by the numeral 20, releases the meat strips 10 from the tray 12 as the tray 12 passes along a tray conveyer 22 and through a releasing station 24. Passage through the releasing station 24 separates the underside of the meat strip 10 from the surface of the tray 12 over a major fraction of the area of the meat strip 10, but typically not all of the meat strip is completely unstuck or released.

In a further aspect of the invention, the release and separation of the meat strips 10 from the tray 12 is completed, and the meat strips 10 are removed from the tray 12 and arranged in an orderly array for further processing, specifically for a cutting operation to produce $4\frac{1}{4}$ inch long strips for packaging. In this further aspect of the invention, as the tray 12 reaches the end of the tray conveyor 22, it enters a tray inverter 26, wherein the tray 12 and the meat strips 10 contained thereon are inverted onto a tray remover 28. The tray remover 28 has a central depressed region 30 and two raised regions 32 along either side of the tray remover 28, the depressed region 30 and the raised regions 32 extending parallel to the direction of motion of the tray 12 along the tray remover 28. Each tray 12 is supported at its ends on the two raised regions 32, with the center portion of the tray 12 suspended over the depressed region 30, so that the partially released meat strips tend to hang downwardly into the depressed region 30. Those meat strips which were fully released in the releasing station 24 fall downwardly during the tray inversion and lie on the tray remover 28. A peeling plate 34 is positioned at a height intermediate between the bottom of the depressed region 30 and the top of the raised region 32, within the depressed region 30. As the inverted trays 12 pass over the plate 34, the trays 12 are forced upwardly, while any partially released meat strips hanging downwardly from the inverted trays 12 are peeled away from the trays 12 by the peeling plate 34. The trays 12 are then conveyed upwardly for gathering and reuse, and the separated meat strips are conveyed under the peeling plate 34 for further processing.

Referring to FIGS. 5-9 for a more complete illustration of the releasing station 24, trays 12 from a drying oven (not shown) are loaded onto a tray conveyor 22 moving toward the releasing station 24, as indicated by the direction of an arrow 36 in FIGS. 1 and 5. The tray conveyor 22 preferably moves the trays 12 on a first moving belt 38, which is supported and moved by a pair of first pulleys 40. The first pulleys 40 are driven by a first motor 42, so that the trays 12 move along the tray conveyor 22 toward the releasing station 24.

In the preferred embodiment, the releasing station 24 comprises two sets of driven rollers, a first set of releasing rollers 44 positioned below the tray 12 as it passes through the releasing station 24, and a second set of back-up rollers 46 positioned above the tray 12 as it passes through the releasing station 24. The rollers 44 and 46 are chain or belt driven by the first motor 42, to have a surface speed equal to the rate of linear movement of the tray 12 through the rollers 44 and 46. After passing through the releasing station 24, the tray 12 is carried forward by a second moving belt 47, which is supported on a pair of second pulleys 51 and belt driven by the first motor 42. The first motor 42 drives the first and second moving belts 38 and 47, and the rollers 44 and 46, through a chain or belt drive system 57.

The releasing rollers 44 are preferably cylindrical rubber rollers turning about their cylindrical axes on shafts 48. Projecting outwardly from the surface of each of the releasing rollers 44 is a plurality of protrusions in the form of projections 50, each projection having a transverse cross-sectional area smaller than that of the apertures 18 in the tray 12, so that the projections 50 can penetrate upwardly through the apertures 18 to contact an underside 52 of the meat strip 19. In this way, the projections 50 gently contact the underside 52 of the meat strip 10 to lift the meat strip 10 upwardly as it passes over the releasing roller 44, as best illustrated in FIGS. 8 and 9. The height of the releasing rollers 44 is adjusted by moving pillow block bearings 49 upwardly or downwardly using cams 52, so that the contact force between the projections 50 and the meat strip 10 may be decreased or increased, as required.

The projections 50 are preferably formed of a soft rubber material, so that they may be displaced sideways in a horizontal plane by small amounts if the projections 50 do not immediately engage the apertures 18. Thus, even though the spacings of the projections 50 on the releasing roller 44 do not exactly match the center-to-center spacing of the apertures 18, the sideways flexibility of the projections 50 allows the projections 50 to find their way into and upwardly through the apertures 18 to contact the underside 52 of the meat strip 10. Additionally, the projections 50 may be randomly placed on the surface of the releasing roller 44, or, in a preferred commercial embodiment, be placed in a spiral pattern on the surface of the releasing roller 44. The spiral pattern further aids in registering the projections 50 with the apertures 18. The ability to achieve registry of the projections 50 and the apertures 18, even in the absence of an exact match in spacing, is important, since it is desirable to use a commercially available product as the releasing roller 44 and also because there may be variations in the aperture spacings between various trays 10. The preferred releasing roller 44 is a commercially available roller typically used as a rubber brush, and purchased from FMC Corporation, San Jose, Calif., as catalog number 4834-682-114. This roller 44 is a 6-inch long by 4-inch diameter cylinder, having approximately 320 tapered cylindrical rubber projections 50 thereon, with each projection 50 having a maximum cross-sectional diameter of about 3/16 inch and a height of about 1¼ inches. The projections 50 are arranged on this roller in a spiral pattern, thus increasing the likelihood of registry between some projections 50 and the apertures 18.

Under the upward deflecting force of the releasing rollers 44 against the adhered strips, the tray 12 and the strips 10 tend to move upwardly and must be restrained from such movement, to exert a parting force between the meat strips 10 and the tray 12. The back-up rollers 46 are mounted above the tray 12, and positioned to contact the top of the meat strip 10 to prevent it and the tray 12 from moving upwardly. The back-up rollers 46 in turn on shafts 54, which are mounted in pillow block bearings 56. Pillow block bearings 56 are adjustable upwardly and downwardly, to allow control over the ability of the meat strips 10 and tray 12 to move upwardly. In the preferred embodiment, the back-up rollers 46 are 5-inch diameter by 6-inch long rollers made of a plastic such as nylon, teflon or polyethylene material, to provide a low-friction contact between the back-up rollers 46 and the strips 10. The back-up rollers 46 are adjusted to contact the tops of the strips 10. Alternatively, the back-up rollers 46 could contact portions of the tray 12, to provide the restraining function required to prevent gross upward movement of the meat strips 10 and tray 12 under the upward lifting of the releasing rollers 44. Gross upward movement of the tray 12 would be a movement that lifts the entire tray 12 or strip 10 upwardly. The back-up rollers 46 prevent gross upward movement while allowing the local upward movement and flexure caused by the releasing rollers 44, as illustrated in FIGS. 8 and 9.

As illustrated in FIGS. 6 and 8, the releasing rollers 44 and the back-up rollers 46 should be horizontally offset from each other. In this preferred embodiment, the offset is parallel to the direction of motion 36 of the first moving belt 38. The total number of releasing rollers 44 preferably differs from the total number of back-up rollers 46 by one, so that there is either one more releasing roller 44 than back-up roller 46, or one more back-up roller 46 than releasing roller 44, thereby creating a symmetrical offset pattern of rollers 44 and 46, when viewed from the side. In FIGS. 6 and 8, the preferred number of two releasing rollers 44 and three back-up rollers 46 is illustrated, although the invention is not limited to this embodiment. The horizontal offset between the releasing rollers 44 and the back-up rollers 46 causes the meat strip 10 and tray 12 to flex alternately upwardly and downwardly as they pass over the individual rollers 44 and 46. This flexing action of the meat strips 10 and tray 12 aids in the release of the meat strip 10 from the tray 12, in addition to the direct upward deflecting force of the projections 50 directly against the underside 52 of the meat strips 12, through the apertures 18.

It is emphasized that the function of the releasing rollers 44 and the back-up rollers 46 is to gently separate and release the meat strip 10 or other fragile food product from contact with the tray 12. In certain other processing applications, it is known to pass meat between two sets of rollers having hard projections thereon, so that the kneading and penetrating action of the projections tenderizes and softens the meat product. The offset rollers 44 and 46 of the present invention do not perform this function, as the projections 50 on the releasing rollers 44 contact the meat strips 10 with a relatively gentle force which does not have a penetrating or tenderizing effect on the dried meat strips 10. That is, the mechanical effect of the rollers 44 and 46 is to gently dislodge, separate, and release the meat strips 10 by forcing them upwardly from the tray 12, not to act directly upon the meat to alter its structure in any respect. Thus, the term "gently", as used herein, refers to an absence of substantial penetration and modification of the food product itself.

Thus, in another embodiment illustrated in FIG. 13, the releasing rollers 44 may be replaced by an air manifold 130 having nozzles 132 directing flows of air upwardly against the underside of the tray 12 and through the apertures 18, to force the meat strips 10 upwardly in the same fashion as do the projections 50 in the above-described embodiment. In this embodiment, no physical contact with the underside 52 of the meat strips 10 is required, with the upward deflecting force being supplied entirely by the jets of air. Although this embodiment has been found operable, the above-described embodiment utilizing releasing rollers 44 is preferred, as the embodiment utilizing air jets requires additional capital expenditure in the form of a compressor to supply compressed air to the manifold.

After the tray 12 passes through the releasing station 24, it is observed that some of the meat strips 10 are released and separated from the tray 12 along their entire length and width. Such meat strips 10 could at this point be lifted off the tray 12. In the majority of instances, however, it is found that the meat strip 10 is partially released from adhering to the tray 12. Some relatively small portions of the area of the underside 52 of the meat strip 10 may remain stuck to the tray 12, particularly near to the ends of the meat strips 10. The reason that such partially released meat strips 10 do not release fully from the tray 12 is not known with certainty, but it is observed that the ends of the tray 12 are not fully restrained by the back-up rollers 46 when passing over the releasing rollers 44. The ends of the tray 12 are therefore lifted so that the projections 50 do not fully penetrate the apertures 18, leaving the meat strip 10 in such areas possibly stuck to the bottom of the tray 12. Also, at the ends of the trays 12, the projections 50 do not readily fit into the corners to release the portions of the strips 10 which hang over the ends of the trays 12. The degree of partial release may be improved by increasing the number and varieties of rollers 44 and 46, until complete release is achieved for all areas of all meat strips 10. However, this approach is not preferred, inasmuch as the orderly removal of the meat strips 10 is accomplished by a further aspect of the invention, to be described subsequently, which both completes the release of the partially released meat strips 10 from the trays 12 and also arranges all of the meat strips 10 in an orderly array which is particularly well suited for subsequent processing, such as cutting the meat strips into short pieces suitable for packaging. This further aspect of the invention is accomplished without any manual labor, which might otherwise be required.

In respect to the further aspect of the invention, it is noted that partially dried meat strips having a width of about 1 inch, thickness of about ⅛ inch, and length of 48 inches are very difficult to handle and align on a commercial scale, wherein as many as 3000 trays and 12000 strips of meat may be processed per hour. The strips of meat are more fragile and easily torn than comparable pieces of natural meat, and therefore subject to breakage in this highly elongated, very thin form. Moreover, it is difficult to align the strips in an orderly fashion so that they may be passed through power cutting knives to produce exactly eleven uniform cut pieces, with only about ¼ inch waste on each end, these pieces being desired for uniformity in packaging. The further aspect of the invention described next permits such handling and alignment of the meat strips 10, without introduction of expensive manual labor and without damage to the meat strips.

In accordance with this further aspect of the invention, as best illustrated in FIGS. 10–12, the upright trays emerging from the releasing station 24 on the second moving belt 47 are conducted into the tray inverter 26. The tray inverter 26 includes an end stop 70 located at the end of the tray conveyor 22. Forward motion of the trays 12 is thereby halted and the tray 12 slides sideways downwardly along an inclined surface 72, as best illustrated in FIG. 11. The initial motion of the tray 12 down the inclined surface 72 is aided by a tapered intersection 74 between the inclined surface 72 and the upper surface of the tray conveyor 22, so that the front end of the tray 12 contacting the end stop 70 is suspended and straightened over the inclined surface 72. The weight of the front end of the tray 12 then pulls the tray 12 sideways and down the inclined surface 72. Upon reaching the lower end 76 of the inclined surface 72, the leading or lowest sideways edge of the tray 12 tips downwardly so that the tray 12 is tipped on its side to a generally sideways vertical position by contact with a back plate 79, as illustrated at numeral 78 in FIG. 11. Any fully released meat strips are held in a straight aligned position by contact with the back wall 79 as the tray 12 is tipped and moves downwardly through a tray drop channel 81 between the back plate 79 and the lower end 76. The tray 12 then passes on to the tray remover 28.

The tray remover 28 comprises a table 82 supporting a third moving belt 80, also termed a strip conveyor belt, the peeling plate 34 and associated structure. The table 82 is positioned so that the third moving belt 80 is below the tray conveyor 22 and the tray inverter 26, and oriented so that the third moving belt 80 moves in a direction opposite to that in which the trays 12 slide down the inclined surface 72. The motion of the third moving belt 80 completes the turning and inversion of the sideways oriented vertical tray such as that indicated at the numeral 78, so that the tray 12 is deposited from the tray inverter 26 in an inverted or upside-down position as indicated by a tray 86 on the third moving belt 80. Additionally, because the third moving belt 80 is generally perpendicular to the tray conveyor 22, the inverted tray 86 lies across the width of the third moving belt 80.

As illustrated in FIG. 11, the third moving belt 80 is supported on a set of crowned pulleys 88 and driven by a second motor 90. The third moving belt 80 is preferably formed of a highly wear resistant, flexible fabric-like material, so that the belt may flex to follow the contours of its supporting surface, as discussed subsequently. The surface of the third moving belt 80 preferably has transverse ribs or ridges thereon to catch the leading edge of the tray 12 as it contacts the belt 80. Preferably, the belt is formed of a commercially available conveyor belt material such as 3-ply Fabsyn polyester belt, available from Fabreeka Products Co., Inc., Boston, Mass. A smooth belt, not having ribs thereon, is also operable.

The upper surface of the table 82, upon which the third moving belt 80 rides, is contoured to facilitate the removal of the meat strips 10 from the inverted trays 86. As the third moving belt 80 passes over the crowned pulleys 88, the third moving belt 80 is generally flat. The third moving belt 80 then passes on to an upper support surface 92 of the table 82. As illustrated in FIG. 12, the upper support surface 92 is contoured to have a raised portion 94 adjacent each transverse edge of the upper support surface 92, and a depressed portion 96 in the center of the upper support surface 92. The raised portion 94 and depressed portion 96 of the support surface 92 produce the similarly configured raised region 32 and depressed region 30 in the third moving belt 80 as it rides over the upper support surface 92. The transition region between the raised portion 94 and the depressed portion 96 is preferably gently tapered, so as to avoid any snagging of the third moving belt 80. The width of the depressed portion 96 and the corresponding depressed region 30 is less than the length of the inverted tray 86, so that the ends of the inverted tray 86 are supported by the raised regions 32 on the opposite sides of the third moving belt 80. Any meat strips 10 which have been fully released from the tray 12 at the releasing station lie on the surface of the third moving belt 80.

In the event that a meat strip 10 has not been fully released and remains partly stuck to the inverted tray 86, such a hanging meat strip 98 is gently peeled from the inverted tray 86 by the peeling plate 34. The peeling plate 34 is a longitudinally tapered plate having a pointed leading edge, the point facing oppositely to the motion of the third moving belt 80, the motion being indicated by the arrow 84. A point 100 of the peeling plate 34 is disposed just below the inverted tray 86, in the gap between the inverted tray 86 and the third moving belt 80 in the depressed region 30. The point 100 is thereby interposed between the inverted tray 86 and any hanging meat strip 98, so that the hanging meat strip 98 is gradually and gently peeled away from the inverted tray 86 as the inverted tray 86 progresses forwardly in the direction of motion 84. Final release and removal of any partially released meat strips 10 is thereby ensured. Optionally, the hanging meat strips 98 may be forced downwardly to aid the point 100 in passing between the inverted tray 86 and the strips 98. The preferred approach is to provide a downward jet of compressed air from a manifold 99 positioned above the longitudinal center of the inverted tray 86 as it reaches the point 100. This air jet forces the strip 98 downwardly to widen the gap between the strip 98 and the surface of the inverted tray 86.

It is found that some of the trays 12 become warped after repeated use, with the result that an inverted tray 86 that is warped might not be properly positioned so that the peeling plate 34 can function to peel the hanging meat strips 98. A pair of tray straightening rollers 101 are positioned to contact the surfaces of the inverted trays 86 near their ends, above the portion supported on the raised region 32. The rollers 101 are chain- or belt-driven by the second motor 90 and hold the ends of the inverted trays 86 down tightly, thereby holding the entire inverted tray 86 straight to allow engagment with the peeling plate 34.

By the cooperative action of the releasing station 24, the tray inverter 26 and the peeling plate 34, all meat strips 10 initially lying on the tray 12 are deposited onto the surface of the third moving belt 80, to lie in an orderly array transversely to the direction of movement 84 of the third moving belt 80, as indicated at numeral 105. The removed meat strips 105 are then transported along the third moving belt 80 to be deposited upon a fourth moving belt 102, whereupon the removed meat strips 105 are transported to other areas for subsequent processing. Specifically, the meat strips 105 are transported to power knives (not shown) for transversely slicing the meat strips 105 into shorter lengths. The apparatus 20 has the special advantage of depositing the released and removed meat strips 105 in a uniform array so that, with minor adjustments to ensure alignment of the ends of the meat strips 105, the meat strips 105 may be so processed with a minimum of repositioning and alignment. The chance of damaging the fragile food product is thereby reduced, as is the need for the use of manual labor to reposition the pieces. In contrast, in the prior approach, manual stacking and positioning of the meat strips 105 required the expenditure of considerable manual labor.

The apparatus 20 also provides for the collection and return of emptied trays 104 for receiving with newly extruded meat strips and reprocessing. As the inverted tray 86 moves forwardly in the direction 84 and engages the peeling plate 34, it is gradually lifted upwardly as the hanging meat strips 98 are separated. Upon complete release of any hanging meat strips 98, the inverted tray 86 becomes the emptied tray 104. The emptied tray 104 is moved upwardly along an inclined surface 106 which forms a continuation of the peeling plate 34. The emptied tray 104 is moved forwardly by any convenient drive means. Preferably, the drive means is a fifth moving belt 108 supported on a pair of crowned pulleys 110 and chain- or belt-driven in the direction of the arrow 84 by the second motor 90 at a rate of travel equal to that of the third moving belt 80. The fifth moving belt 108 need not be a belt for supporting the tray or the food product, but instead engages the inverted emptied tray 104 only to move it forwardly. Preferably, the fifth moving belt 108 is a pair of thin continuous belts such as timing belts. In the preferred embodiment, the emptied tray 104 is moved forwardly in the direction of the arrow 84 to almost the end of the inclined surface 106, whereupon the emptied tray 84 is swept forwardly by a sweeper roller 114 driven by the second motor 90, to sweep the inverted trays 104 further in the direction of the arrow 84. The sweeper roller 114 is preferably a roller having soft, rubber protrusions thereon to engage the emptied tray 104, of the same type as previously described for the releasing rollers 44.

The sweeper roller 114 sweeps the emptied tray 104 onto a sixth moving belt 116, which collects the emptied trays 104 for stacking onto carts (not shown). The trays are then returned to the extrusion area for inspection, cleaning if necessary, and subsequent reuse.

In operation of the preferred embodiment, the tray 12 carrying meat strips 10 on the surface thereof is transported along the tray conveyor 22, and through the releasing station 24 to fully or partially release the meat strips 10 from the tray 12. The tray 12 then progresses along the tray conveyor 22 and is inverted by the tray inverter 26 onto the third moving belt 80. Inverted tray 86, which is supported by its ends on the raised regions 32 of the third moving belt 80, is passed over the peeling plate 34, so that all of the meat strips are separated to lie on the surface of the third moving belt 80, while all of the emptied trays 104 pass upwardly and to the sixth moving belt 116 for stacking, return and reuse.

In the described apparatus for releasing fragile food products from a surface to which they have adhered and possibly stuck, the food products are handled gently, automatically, and in an orderly fashion. Breakage and loss of the fragile food products is thereby minimized. The food products are delivered in an orderly array to subsequent processing machinery, and the supporting surfaces are returned in an orderly fashion to the starting point of the process for reuse. The apparatus of the invention requires no manual labor, except for an operator to keep the machinery in working order and watch for any problems that might develop, and workers to load trays 12 into the machine and stack emptied trays 104. The apparatus may be constructed relatively inexpensively from commercially available components.

It will now be appreciated that, through the use of this invention, food products which are fragile and difficult to handle manually may be released and separated from support surfaces to which they have adhered, and possibly become stuck during prior processing operations. This apparatus promotes considerable savings in labor costs and reduces the damage to, and loss of, the fragile food product. Although a particular embodiment of the invention has been described for purposes of illustration, various modifications may be made without departing from the spirit and scope of the invention. Accordingly, the invention is not to be limited except as by the appended claims.

What is claimed is:

1. Apparatus for removing a strip of food product from a horizontal support tray having an array of apertures therethrough, the strip of food product having been previously deposited onto a flat surface of the tray and then processed on the tray, during which prior processing the underside of the food product sticks to said flat surface of the tray, the apparatus comprising:

first and second tray conveyor belts for supporting and moving the tray in a horizontal position along the longitudinal axis of the tray; and a releasing station interposed between the tray conveyor belts, the releasing station including at least one releasing roller that extends laterally across the side of the tray opposite the surface of the tray to which the food product is initially adhered, said releasing roller having protrusions thereon extending radially outwardly from said releasing roller and projecting vertically through the apertures of the tray to contact and lift the food product away from the tray as the tray passes said releasing roller and said releasing roller turns, and at least two back-up rollers that extend laterally across the surface of the tray opposite the side thereof to which the food product is initially adhered and displaced horizontally on opposite sides of said releasing roller along the direction of movement of the tray on said tray conveyor belt, the back-up rollers contacting the surface of the food product opposite the tray surface to which it is adhered thereby preventing gross vertical movement of the tray and the food product while allowing the strip of food product to be urged away from the tray by said releasing roller, thereby releasing at least a portion of the food product from the tray, with said tray being in substantial contact with the tray conveyor belts during release of the food product therefrom.

2. Apparatus as set forth in claim 1 wherein the protrusions of said releasing roller are formed of a flexible material.

3. Apparatus as set forth in claim 1 wherein the releasing station includes three back-up rollers and two releasing rollers.

4. Apparatus as set forth in claim 1 wherein the food product is a strip of a meat product which has been previously dried on the tray.

5. Apparatus as set forth in claim 1 which further includes a peeling plate for mechanically separating from the tray any part of the strip of food product which remains partially stuck to the tray after the tray passes through the releasing station.

6. Apparatus as set forth in claim 1 which further includes:

a strip conveyor belt positioned along the direction of movement of the tray conveyor belts and below and moving generally perpendicular to said tray conveyor belts, said strip conveyor belt having a depressed central portion and raised side portions extending parallel to the direction of motion of said strip conveyor belt, the width of the depressed portion being less than the length of the tray, so that the tray may be supported over the depressed portion by contact of the ends of the tray with the raised side portions of said strip conveyor belt;

a tray inverter at the end of the second tray conveyor belt, said inverter including a tray drop channel for receiving a leading sideways edge of the tray and conducting the leading edge downwardly, whereupon the leading edge is directed into contact with said strip conveyor belt and inverted by the movement of said strip conveyor belt, the ends of the tray being supported by said strip conveyor belt with the strip of food product extending transversely to said strip conveyor belt; and a peeling plate having a forward edge positioned at a height intermediate between the depressed and raised portions of said strip conveyor belt and pointing oppositely to the motion of the strip conveyor belt, whereby said peeling plate forces the tray upwardly and the strip of food product downwardly to continue moving on said strip conveyor belt, thereby mechanically releasing any remaining portions of the strip stuck to the tray.

* * * * *